United States Patent [19]
[11] 4,318,953
Smith et al.
[45] Mar. 9, 1982

[54] TRANSFER MATERIALS

[75] Inventors: Brian J. Smith; Geoffrey R. Taylor, both of London, England

[73] Assignee: Letraset International Limited, London, England

[21] Appl. No.: 115,709

[22] Filed: Jan. 28, 1980

Related U.S. Application Data

[63] Continuation of Ser. No. 948,224, Oct. 3, 1978, abandoned.

[30] Foreign Application Priority Data

Oct. 4, 1977 [GB] United Kingdom ............... 41247/77

[51] Int. Cl.[3] .......................... B32B 3/18; B41M 3/12

[52] U.S. Cl. .................................... 428/200; 156/234; 156/235; 156/240; 156/249; 428/204; 428/207; 428/349; 428/354; 428/913; 428/914

[58] Field of Search ............... 156/234, 240, 230, 235, 156/237, 238, 249, 277; 427/147, 148; 428/195, 200, 201, 204, 207, 343, 349, 354, 913, 914, 202

[56] References Cited

U.S. PATENT DOCUMENTS 3,987,225 10/1976 Reed et al. ............................ 428/43
4,037,008 7/1977 Tugwell ............................ 428/200

*Primary Examiner*—Bruce H. Hess
*Attorney, Agent, or Firm*—Darby & Darby

[57] ABSTRACT

Transfer materials are described which are of particular value in sign making applications. The materials consist of a carrier sheet, indicia thereon, usually formed by printing from a printing ink composition and adhesive over the indicia. The dry transfer material may be used in the usual way to assemble a desired legend on a temporary carrier sheet using the pulling power of the adhesive optionally assisted by the "stretch release" technique if the carrier sheet and indicia are appropriately formulated. According to the invention, the indicia are formulated so that following their transfer to build up the desired legend, they may be adhered under the action of heat and pressure without plastic deformation to the surface of a transparent or translucent rigid sign sheet made of polymethylmethacrylate, polyvinylchloride or cellulose triacetate.

12 Claims, No Drawings

TRANSFER MATERIALS

This is a continuation, of copending application Ser. No. 948,224, filed Oct. 3, 1978, now abandoned.

This invention relates to transfer materials and particularly to transfer materials useful in sign manufacture.

Dry transfer lettering materials have been known for many years and are described for example in British Pat. Nos. 959,670 and 954,459. Such dry transfer materials conventionally consist of a flexible, transparent or translucent plastics film on which are arranged a plurality of transferable indicia, usually alphabetic letters, numbers and punctuation marks. On top of each indicium is a coating of adhesive which enables the indicium to be transferred from the carrier sheet and adhered to a receptor surface. In order to facilitate such transfer, the relative mechanical characteristics of the indicium and the carrier sheet may be so chosen that the bond between the carrier sheet and the indicium may be weakened or broken by local stretching of the carrier sheet effected by rubbing over the back of the carrier sheet in the region of an indicium with a suitable stylus. This system is described in Specification No. 959670.

Such dry transfer materials have been used widely for some years in various applications. Because of the relatively fragile nature of the ink film of which the indicia are composed, such materials are generally unsuited for the production of signs which may be exposed to the weather, cleaning by detergent solutions or the like and accordingly in the manufacture of signs, where it is desired to use preformed lettering rather than hand-printed lettering, there has been a tendency to use die-cut vinyl lettering rather than dry transfer lettering. Dry transfer lettering may be used in constructing a composite sign where the lettering is overlaid by a protective sheet e.g. the lettering on a suitable carrier such as paper may be inserted in a frame and protected by a glass or plastics cover through which the lettering is visible. Such systems are generally unsatisfactory and tend sometimes to be unsightly.

Our copending application No. 37661/78 describes and claims methods of sign making using dry transfer material. Briefly summarised, the dry transfer material is used to build up a sign by successively transferring letters and the like on to a temporary support surface, e.g. a sheet of coated paper. The so transferred indicia are then caused to adhere under the action of heat and pressure to the surface of a transparent or translucent sign sheet. They adhere more strongly to the sign sheet than to the temporary support sheet which is then stripped away whereafter the indicia are overcoated e.g. by spray painting. The indicia of the sign are viewed through the transparent or translucent sheet and are protected by it. The indicia appear against a background of the oversprayed coating.

Depending upon the particular material of the sign sheet and the process conditions used, it is possible to operate that sign making method using some commercially available dry transfer materials. However, many such materials to not work at all in the method, and even in the case of those which do, the results are not consistent or repeatable and particular types of dry transfer material can only be successfully used with particular types of sign sheet.

We have now found that it is possible to produce dual purpose transfer materials i.e. materials in which the indicia may be transferred from an original substrate to a temporary support and thereafter from that temporary support onto a sign sheet in which the disadvantages of the previously known materials are avoided.

According to the present invention there is provided a transfer material comprising a transparent or translucent carrier sheet bearing on one side a plurality of transferable indicia, each indicium bearing on its face remote from the carrier sheet an adhesive capable of adhering the indicium to a desired substrate, wherein the indicia are formed of a composition which, under the action of heat and pressure may be caused to adhere to the surface of a rigid polyvinyl chloride sheet, cellulose triacetate sheet, and polymethyl methacrylate sheet more strongly than the adhesive adheres to the desired substrate.

Such materials are of particular value in carrying out the sign making method noted above since the indicia will adhere to all three of the principally preferred sign making sheets. In many cases, the indicia will also adhere under the action of heat and pressure to other sign sheet materials, for example glass, polycarbonate sheet polyethylene sheet, polystyrene sheet and polypropylene sheet.

Rigid polymethylmethacrylate sheet, polyvinyl chloride sheet and cellulose triacetate sheet are widely available as sign making materials. Polymethylmethacrylate sheet is commercially available under the Trade Marks PERSPEX and PLEXIGLAS. Polyvinylchloride sheet and cellulose triacetate sheet are obtainable from a very wide variety of sources of supply in the form of transparent films which are normally plasticised to avoid their being too brittle and which are sold as "semi-rigid film" grades.

A variety of compositions may be used for the indicia of the transfer material according to the present invention. All of the compositions may be regarded as being formed of a hot melt or heat seal adhesive together with a suitable pigment or dyestuff which renders the area of the indicium visible. The indicia should be formulated so that they act satisfactorily both as dry transferable letters under the pulling power of the applied adhesive and satisfactorily as heat transferable letters. The indicia must accordingly be satisfactorily film-forming so that they do not break up on transfer at ambient temperature or craze when transferred under heat and pressure. Preferably the mechanical characteristics of the indicia are such as to enable their removal from the transparent or translucent carrier sheet with the assistance of the stretch release technique referred to above.

One particularly preferred class of composition for the manufacture of the indicia is that of nitrocellulose based printing inks which contain in addition to the nitrocellulose a high molecular weight plasticiser and a heat stable dye and/or pigment and which are free or substantially free of low molecular weight material. Any content of low molecular weight material should be kept low in order to avoid difficulties during the heat transfer stage; it is found that if a nitrocellulose based ink is used which contains a proportion of so-called solvent plasticisers, as are conventional in such inks used for dry transfer manufacture, the presence of those plasticisers tends to prevent the formation of a satisfactory adhesive bond under the action of heat and pressure. Indeed, care must be taken that commercially available high molecular weight plasticisers used do not contain high a proportion of low molecular weight material.

Preferably the high molecular weight plasticiser in such compositions is an unmodified polyester plasticiser of molecular weight (measured by size exclusion chromatography) 8,000 to 50,000, most preferably a condensation product of a dibasic acid having 6 to 10 carbon atoms in a hydrocarbon chain and a polyhydric alcohol. We have found that condensation products of sebacic and/or adipic and/or azelaic acid with glycerol are particularly effective. A single high molecular weight plasticiser can be used or a mixture of such materials may also be used. Commercially available high molecular weight polyester plasticisers which are chemically mixtures of compounds may be used satisfactorily.

The relative ratio of plasticiser to nitrocellulose base may vary depending upon the particular plasticiser and nitrocellulose used and depending upon for example the type of transparent or translucent carrier sheet used in the transfer material. The plasticiser content should not be too high since this will give rise to difficulties in removing the printed indicia from the carrier sheet. On the other hand, the plasticiser content should not be too low or there will be a tendency for the printed indicia to release spontaneously from the carrier sheet during manufacture or storage of the transfer material. Generally an amount of 60 to 120 parts by weight of high molecular weight plasticiser per 100 parts by weight of cellulose nitrate base is found to be satisfactory. The optimum proportion for any particular transfer material may be easily found by simple experiment.

A further preferred type of indicia forming composition is one based on a flexible film-forming thermoplastic or thermosettable polymeric base which changes from a soft flexible material to a tacky adhesive at a temperature within the range of 80° to 180° C. Various thermoplastic acrylic polymeric materials are very suitable and a wide variety of formulations may be made. Furthermore, certain plastisol and organosol inks may be formulated to have the required properties.

The indicia in the transfer material may be formed by printing as indicated above, either by a single printing process or by building up from a number of parts applied by successive printing processes, either of the same type or of different types. Alternatively, the indicia may be produced photographically by modifying one of the known photographic methods of producing dry transfer materials. Such methods are described inter alia in British Patent Nos. 1079661, 1291960 and 1364627.

Mixtures of polymeric materials may be used as the base for the indicia forming composition. For example in the case of indicia based on thermoplastic acrylic polymers, e.g. methylmethacrylate homopolymers or methylmethacrylate/butyl methacrylate copolymers, these may be used alone, in admixture with one another, or either or both may be used admixed with thermoplastic vinylacetate/vinylchloride copolymers. Other polymeric base materials which may be used by themselves or in admixture with others include vinyl acetate/vinylchloride copolymers, vinylacetate/vinylalcohol copolymers, polystyrenes, polyvinylbutyrals, cellulose acetate butyrates, various polyamides and polyurethane elastomers.

In all cases, the composition of the indicia must be appropriately formulated so that they may be transferred under the action of heat and pressure to at least the three specific receptor materials noted above without plastic deformation and without damage to that substrate. The adhesion of the indicia to that receptor following removal of the temporary support sheet to which they have been applied during the sign making process should be such that it is not removed when the adhesive tape test described in section 9.7 of ASTM D-2571, is carried out, using, in place of the 30 minute period specified in that ASTM specification, a 2 hour period.

The preferred method of manufacture of the transfer materials of the present invention is to screen print the indicia using the indicia forming composition formulated as a printing ink onto the transparent or translucent carrier sheet. Following printing and drying, the whole printed area of the carrier sheet including the spaces between the indicia is preferably supercoated with a substantially nontacky or low tack pressure sensitive adhesive. If desired the indicia may be formed in known fashion by printing in either order an indicium area in a colourless carrier film and a visible image in coloured ink. The visible image may be printed e.g. by gravure, letterpress or lithographic printing and the colourless carrier film by screen printing. In such a case, the properties of the material used to print the colourless carrier film tend to determine the adhesive properties of the indicia under the action of heat and pressure, since the colourless carrier film tends to predominate over the relatively much thinner and less continuous gravure, letterpress or lithographic image.

The adhesive coating may be deposited from solution in one or more organic solvents or it may be deposited as an aqueous emulsion. Deposition from organic solvent is preferred since deposition from an emulsion may leave residues of water trapped in the transfer material which may cause difficulty if the transfer material is used in the sign making process indicated above due to vaporisation of the water during the heat/pressure transfer step.

A wide variety of adhesives for use in dry transfer materials is known and most of them may be used without difficulty in the transfer material of the present invention. One particular type of such adhesive consists of a highly tacky polymeric component such as a polyvinyl ethylether, polyvinyl isobutyl ether, polyisobutylene or a mixture of one or more of these together with a tack modifying or tack reducing components. Typical tack reducing components are finely divided mineral materials, particularly finely divided silica and waxy materials such as natural and synthetic waxes. The adhesive may include both mineral and waxy materials. During the sign making process noted above, the adhesive is of course subjected to the heat and pressure used to adhere the indicia to the surface of the transparent or translucent sign sheet and it should accordingly not be one which becomes too fluid under the action of such heat and pressure since that might lead to slippage and distortion of the indicia during transfer.

Most preferably, the adhesive should be one which will adhere preferentially to the temporary support material used in the sign making process noted above so that after the indicia have been adhered to the sign sheet, when the temporary support material is peeled away, the adhesive, which has now served its purpose, is also removed. The temporary support sheet may be for example a plastics film such as a polyethylene terephthalate sheet a treated paper such as a silicone coated parchment or a metal foil such as aluminium foil.

The transparent or translucent carrier sheet of the transfer material of the present invention may be anyone of those conventionally used in the manufacture of dry transfer lettering sheets. Preferred are plastics films of polyethylene, styrenebutadiene copolymers, polypropylene and polyethylene terephthalate. Coated papers may however also be used. The thickness of the carrier sheet is preferably 0.1 to 0.15 mm and the surface of the carrier sheet bearing the indicia may if desired have a release coating to modify its properties appropriately.

The following examples will serve to illustrate the invention. In these examples all parts and percentages are by weight unless otherwise stated.

EXAMPLE 1

A printing ink was formulated as follows: A mixture was made up of:

| | | |
|---|---|---|
| | methylmethacrylate copolymer | 20 parts |
| | ethylene glycol ethylether acetate | 68 parts |
| and | polyvinylchloride, polyvinylacetate copolymer (Vinylite VYHH ex. Bakelite) | 11 parts |

43 parts by weight of this mixture were then triple roll milled together with 9 parts by weight of aniline black pigment, 0.2 parts by weight of fumed silica (Aerosil 300 ex. Degussa) and 3.8 parts by weight ethylene glycol mono ethyl ether acetate. Milling was continued to Hegman Gauge 7.

Thereafter, 24 further parts by weight of the mixture, 10 parts by weight of a 40% by weight solution of methyl methacrylate/butyl methacrylate copolymer (Paraloid B66 ex. Rohm and Haas) in ethylene glycol mono ethyl ether acetate and 10 parts by weight of a methyl methacrylate copolymer solution (40% by weight Paraloid B82 ex. Rohm and Haas in ethylene glycol mono ethyl ether acetate) were added and the mixture stirred to homogeneity.

The black ink so made was used to print letters onto 150 micron thick sheets of high density polyethylene. Silk screen process printing was used, printing being through a 240 mesh screen. The printed images were dried on a belt drier for 30 seconds dwell time at 60° C.

An adhesive was made up as follows:

The following ingredients were stirred together in the proportions by weight given:

| | |
|---|---|
| Fumed silica (Aerosil R972 ex. Degussa) | 8.0 parts |
| Aliphatic hydrocarbon solvent (Exsol 145/160, ex. Esso) | 48.0 parts |
| Polyisobutylene solution (Low molecular weight Oppanol B10 ex. BASF 30% by weight solids solution in Exsol 145/160) | 7.7 parts |
| Polyisobutylene solution (High molecular weight Oppanol B50 ex. BASF 20% by weight solution in Exsol 145/160) | 20.0 parts |
| Polybutene (Low molecular weight Hyvis 10. Ex. B.P. Chemicals Ltd) | 13.8 parts |

The last ingredient was added to the others while hot stirring at 50° to 60° C.

99.0 parts by weight of a 10% by weight solution of polyethylene wax was then added. The polyethylene wax was type ACP6 ex. Allied Chemicals Limited and the solvent was Exsol 145/160.

Finally, a molten 50% by weight solution of a fatty amide (Oleamide, Crodamide O ex. Croda Chemicals) in Exsol 145/160 was added and stirring continued to produce a homogeneous adhesive.

This adhesive was applied by screen printing an overall layer through a 240 mesh screen onto the previously printed polyethylene sheets. The adhesive coating was dried by passing the sheets through a belt dryer at a 30 second dwell time at 65° C. The transfer sheets so produced were protected by interleaving with silconised vegetable parchment paper sheets.

Using the transfer materials so produced in the usual way, a word was built up from individual letters on a 50 micron thick sheet of polyethylene terephthalate film (Melinex ex. ICI).

The film bearing the letters was then passed with the letters in contact with a 2 mm sheet of polymethyl methacrylate (Plexiglas ex. Rohm & Haas) through a heated nip. The temperature of the nip rolls was 170° C. and the assembly was passed between them at a rate of 4 m/minute.

The polyethylene terephthalate sheet was then peeled away from the polymethyl methacrylate sheet to leave the letters firmly adherent to the surface of the polymethyl methacrylate sheet and the right way round then viewed through that sheet. The side of the sheet bearing the letters was then oversprayed with spray paint to give a sign in which the black letters stood out clearly against the coloured paint background and which had a generally pleasing appearance.

EXAMPLE 2

The following ingredients were mixed together in the following proportions by weight:

| | | |
|---|---|---|
| Rutile titanium dioxide (grade R-HD3 ex. British Titan Products) | 29 | parts |
| Copolymer mixture (as in Example 1) | 43 | parts |
| Fumed silica (Aerosil 300 ex. Degussa) | 0.2 | parts |
| Ethylene glycol mono ethyl ether acetate | 7.8 | parts |

This mixture was dispersed on a triple roll mill until a fineness of 7 on a Hegman Gauge was achieved and there was then added 10 parts by weight of a methyl methacrylate/butyl methacrylate copolymer solution (as in Example 1) and 10 parts by weight of a methyl methacrylate copolymer solution (as in Example 1).

Dry transfer sheets were prepared by printing this ink as in Example 1 onto 150 micron thick high density polyethylene sheets and subsequently drying and adhesing those sheets exactly as in Example 1.

Words were made up using these sheets in the usual way by transferring individual letters onto 50 micron polyethylene terephthalate sheets. The sheet bearing the words was then passed together with a 1 mm thick transparent polyvinyl chloride sheet through a heated nip. The nip temperature was 120° C. and the polyethylene terephthalate and PVC sheet were passed through at a speed of 4 m/minute. After passing through the nip, the polyethylene terephthalate sheet could be peeled away to leave the white letters adhered to the PVC sheet. The side of the PVC sheet bearing the letters was then sprayed over with black cellulose lacquer and air dried. The resulting sign was of pleasing appearance.

It was found that higher operating speeds could be used in conjunction with higher nip temperatures, for example a nip temperature of 160° C. and a pass speed of 9 m/minute. If high temperatures are used with low speeds, there is a tendency to distortion of the PVC sheet.

EXAMPLE 3

A black ink made up as in Example 1 was used to print indicia on 100 micron high density polyethylene sheets by screen printing using a 61T mesh.

The indicia so printed were overprinted in register using a colourless carrier film of the following formulation:

| | |
|---|---|
| Fumed silica (Aerosil 130 V ex Degussa) | 2.8 parts |
| Polymeric plastiser (Uralac 923/68 ex Synthetic Resins Ltd) | 30.0 parts |
| Sextol phthalate (monomeric plasticiser) (Howflex SP ex Laporte) | 3.7 parts |
| Ethylene glycol monoethyl ether acetate | 99.5 parts |
| Cellulose nitrate (33% DHX 3/5 in butanol) | 63.9 parts |

After each printing, the sheets were belt dried with a 40 second dwell time at 85° C.

The sheets were then overprinted overall with an adhesive of the following formulation:

| | |
|---|---|
| Fumed silica (Aerosil 300 ex Degussa) | 8.8 parts |
| Aliphatic hydrocarbon solvent (ECS 2033 ex Esso) | 76.9 parts |
| Ethylene glycol monethyl ether | 26.0 parts |
| Xylene | 10.3 parts |
| Polyvinyl ethyl ether (low viscosity ex Union Carbide) | 16.0 parts |
| Polyvinyl ethyl ether (high viscosity ex Union Carbide) | 2.0 parts |
| Polyterpene resin (A125 ex R. H. Cole Co.) | 3.2 parts |

The adhesive was printed through a 100T mesh and subsequently dried by passing the transfer materials through a belt dryer with a 40 second dwell time at 85° C.

The transfer material so made was used to build up words on 50 micron thick polyethylene terephthalate sheets (Melinex Grade S ex. I.C.I.) and the legend so formed placed in contact with polymethyl methacrylate sheets 2 mm thick. The assembly of polymethyl methacrylate sheet and letter bearing polyethylene terephthalate sheet was then passed through a heated nip. The nip was heated to 180° C. and dwell time was 2 seconds. The polyethylene terephthalate sheet could then be peeled away to leave the letters firmly adhering to the polymethyl methacrylate sheet.

In order to show up those letters, the polymethyl methacrylate sheet could then be sprayed with paint or backed by a suitable backing.

The material of this Example was used with a backing of retroreflective material (e.g. Scotchlite ex. 3M Company) to form a vehicle identification plate or so-called "numberplate" which was of pleasing appearance and very legible.

EXAMPLE 4

Example 1 was repeated but using an ink made up as follows: first a base medium of a poly methyl methacrylate solution in ethylene glycol mono ethyl ether acetate was made by mixing together:

| | |
|---|---|
| polymethyl methacrylate (Plexigum P 24. Ex-Cornelius Chemical Co.) | 90 parts |
| ethylene glycol mono ethyl ether acetate | 110 parts |
| di ethylene glycol mono butyl ether acetate | 5 parts |
| aromatic hydrocarbon fraction boiling between 168°-200° C. (Aromasol H. Ex- I.C.I.) | 10 parts |

This base medium was then used to prepare black and white inks of the following formulation:

| | |
|---|---|
| Base medium | 215 parts |
| Butyl phthallyl butyl glycollate (Reomol 4PG. ex CIBA-GEIGY) | 9 parts |
| Amide wax (Dehysol Wax) | 2.6 parts |
| Titanium dioxide (Rutile grade RH472 ex Laporte) | 68 parts |
| or | |
| Carbon black pigment (Elftex 150 ex Cabot Carbon Co.) | 14 parts |

To make the ink the ingredients were placed in a suitable container, premixed using a palette knife and then ground on a triple roller mill to Hegman gauge 7.

The inks thus produced were used to manufacture dry transfer lettering sheets as described previously, which were then used to manufacture signs and numberplates. Similar good results were obtained.

EXAMPLE 5

Example 1 was repeated using black and white inks of the following composition, and using an adhesive as set out below:

| White Ink | % |
|---|---|
| Cellulose nitrate (33% n-butanol damped in ethylene glycol monoethyl ether acetate) | 48.3 |
| Polymeric Plasticiser (Paraplex G25 ex Rohm & Haas) | 14.0 |
| Titanium Dioxide | 30.0 |
| Ethylene glycol monethyl ether (oxitol) | 7.7 |

The ink was triple roll milled to Hegman 7 and the final viscosity was adjusted for printing with oxitol acetate.

| Black Ink | | % |
|---|---|---|
| Cellulose nitrate (33% n-butanol damped in ethylene glycol monoethyl ether acetate) | | 62.5 |
| Polymeric Plasticiser (Paraplex G25 ex Rohm & Haas). | | 16.5 |
| Carbon Black | | 7.5 |
| Ethylene glycol monoethyl ether | | 9.5 |
| Dehysol wax (ex Henkel & Cie GmbH) | flow agents | 2.0 |
| Modaflow (ex Monsanto Chemicals Ltd) | flow agents | 2.0 |

The ink was triple roll milled to Hegman 7 and the final viscosity adjusted for printing with oxitol acetate.

| Adhesive | % |
|---|---|
| Fumed silica (Aerosil R972 ex Degussa) | 4.0 |
| Aliphatic hydrocarbon solvent (Exsol 145/160, ex Esso) | 17.2 |
| Oleamide (Crodamide 'O' ex Croda Chemicals Limited) | 10.12 |
| Polyisobutylene solution (low molecular weight Oppanol B10 ex BASF 50% by weight in Exsol 145/160) | 2.33 |

-continued

| Adhesive | % |
|---|---|
| Polyisobutylene solution (High molecular weight Oppanol B50ex BASF 20% by weight in Exsol 145/160) | 10.00 |
| Polybutene (Medium molecular weight Hyvis 30 ex B.P. Chemicals Ltd.) | 6.89 |
| Polyethylene wax solution (Type ACP6 ex Allied Chemicals Ltd. 10% by weight dispersed in Exsol 145/160). 49.46 | |

Similar very satisfactory results were obtained.

We claim:

1. A transfer material comprising a transparent or translucent carrier sheet bearing on one side a plurality of dry transferable indicia, each indicium bearing on its face remote from the carrier sheet a low tack pressure sensitive adhesive capable of adhering the indicium to a desired substrate, each of said indicia comprising a mixture of (a) a film forming base consisting essentially of nitrocellulose and a high molecular weight plasticizer present in an amount of 60–120 parts by weight per hundred parts by weight of said nitrocellulose and, (b) at least one colorant member selected from the group consisting of a heat stable dye and a pigment, said indicia may be transferred from said desired substrate under the action of heat and pressure to the surface of a rigid member selected from the group consisting of a polyvinyl chloride sheet, a cellulose triacetate sheet and a polymethylmethacrylate sheet without plastic flow and said indicia having an adhesive bond to said member which is stronger than the adhesive bond between the desired substrate and said adhesive, and said indicia component (a) being substantially free of low molecular weight material.

2. The transfer material of claim 1 wherein the high molecular weight plasticiser is an unmodified polyester plasticiser of molecular weight measured by size exclusion chromatography 8,000 to 50,000.

3. The transfer material of claim 1 wherein the high molecular weight plasticiser is a condensation product of a dibasic acid having 6 to 10 carbon atoms in a hydrocarbon chain and a polyhydric alcohol.

4. The transfer material of claim 1 wherein the high molecular weight plasticizer is a condensation product of at least one member selected from the group consisting of sebacic, adipic and azelaic acids, with glycerol.

5. A transfer material consisting of a transparent or translucent carrier sheet bearing on one surface a plurality of dry transferable indicia, each of said indicia bearing on its face remote from the carrier sheet a low tack pressure sensitive adhesive capable of transferring said indicia by dry transfer to a desired substrate, said indicia being formed from a composition comprising at least one member selected from the group consisting of a flexible film forming thermoplastic polymeric base and a flexible film forming thermosettable polymeric base which changes from a soft flexible material to a tacky adhesive within the range of about 80° to about 180° C., said indicia being transferable under the action of heat and pressure and without plastic flow from said substrate to the surface of a rigid member selected from the group consisting of a polyvinyl chloride sheet, a cellulose triacetate sheet and a polymethylmethacrylate sheet and, the bond between said indicia and said rigid member being stronger than the bond between said adhesive and said desired substrate.

6. The transfer material of claim 5 wherein the indicia are based on a thermoplastic acrylic polymeric material.

7. The transfer material of claim 5 wherein the indicia adhere, under the action of heat and pressure to each of rigid polyvinyl chloride sheet, cellulose triacetate sheet and polymethylmethacrylate sheet under the conditions specified in section 9.7 of ASTM D-2571 with a 2 hour period in place of the 30 minute period therein specified.

8. A transfer material comprising a transparent or translucent carrier sheet bearing on one side a plurality of dry transferable indicia, each of said indicia bearing on its face remote from the carrier sheet a low tack pressure sensitive adhesive capable of adhering the indicium to a desired substrate, each indicium consisting essentially of a film forming nitrocellulose base and a high molecular weight plasticizer present in an amount of between 60 to about 120 parts by weight per hundred parts by weight of said nitrocellulose, and at least one colorant member selected from the group consisting of a heat stable dye and a heat stable pigment, said plasticizer being free of low molecular weight material, said indicia capable of being transferred from said desired substrate under the action of heat and pressure to the surface of a rigid member selected from the group consisting of a polyvinyl chloride sheet, a cellulose triacetate sheet and polymethylmethacrylate sheet without plastic flow, and said indicia having an adhesive bond to said member which is stronger than the adhesive bond between the desired substrate and said adhesive.

9. The transfer material of claim 8, wherein said high molecular weight plasticizer is an unmodified polyester plasticizer.

10. The transfer material of claim 9, wherein said polyester plasticizer has a molecular weight of between about 8,000 and about 50,000.

11. The transfer material of claim 9 wherein said high molecular weight plasticizer is a condensation product of a dibasic acid having six to ten carbon atoms in the hydrocarbon chain and a polyhydric alcohol.

12. A sign comprising a plurality of indicia in predetermined sign legend order, said indicia being disposed on a plain surface selected from the group consisting of a rigid polyvinyl chloride sheet, a rigid cellulose triacetate sheet and a rigid polymethylmethacrylate sheet, said indicia consisting essentially of a nitrocellulose and a high molecular weight plasticizer present in an amount of between about 60 to about 120 parts by weight per hundred parts by weight of nitrocellulose, and a colorant comprising at least one member selected from the group consisting of a heat stable dye and a pigment, said indicia having been transferred to a desired substrate by adhesion from a carrier sheet on which they were created and from said substrate adhered to said plain surface under the action of heat and pressure and without plastic flow, and said indicia being substantially free of adhesive and said base composition being substantially free of low molecular weight material.

* * * * *

UNITED STATES PATENT AND TRADEMARK OFFICE
CERTIFICATE OF CORRECTION

PATENT NO. : 4,318,953

DATED : March 9, 1982

INVENTOR(S) : Brian J. Smith; Geoffrey R. Taylor

It is certified that error appears in the above—identified patent and that said Letters Patent is hereby corrected as shown below:

On the title page, assignee should read:

-- (73) Assignee: Letraset Corporation,
Paramus, New Jersey --.

Signed and Sealed this

*Fourteenth* Day of *September 1982*

[SEAL]

*Attest:*

GERALD J. MOSSINGHOFF

*Attesting Officer* *Commissioner of Patents and Trademarks*